(12) United States Patent
Ringe et al.

(10) Patent No.: US 8,219,754 B2
(45) Date of Patent: Jul. 10, 2012

(54) CONTEXT INSTRUCTION CACHE ARCHITECTURE FOR A DIGITAL SIGNAL PROCESSOR

(75) Inventors: Tushar P. Ringe, Indore (IN); Abhijit Giri, Bangalore (IN)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 12/835,319

(22) Filed: Jul. 13, 2010

(65) Prior Publication Data

US 2011/0010500 A1    Jan. 13, 2011

Related U.S. Application Data

(62) Division of application No. 11/623,760, filed on Jan. 17, 2007, now abandoned.

(51) Int. Cl.
*G06F 13/00* (2006.01)

(52) U.S. Cl. .................. 711/118; 711/E12.017

(58) Field of Classification Search .......... None
See application file for complete search history.

(56) References Cited

U.S. PATENT DOCUMENTS

| | | | | |
|---|---|---|---|---|
| 5,926,829 | A | * | 7/1999 | Hagersten et al. ............ 711/120 |
| 6,173,371 | B1 | * | 1/2001 | Arimilli et al. ............... 711/146 |
| 6,272,599 | B1 | | 8/2001 | Prasanna |
| 2004/0215893 | A1 | * | 10/2004 | Emerson et al. ............. 711/138 |
| 2006/0195573 | A1 | | 8/2006 | Srivastava et al. |
| 2006/0206874 | A1 | | 9/2006 | Klein |

OTHER PUBLICATIONS

Kojima, "Microprocessor System with Instruction Cache Has Counter Which Sends Out Cache Function Stop Signal to Instruction Cache to Stop Operation of Instruction with Value of Counter Becomes Zero," Derwent Document 1998-067877 (Nov. 28, 1997).

* cited by examiner

*Primary Examiner* — Hetul Patel
(74) *Attorney, Agent, or Firm* — Bingham McCutchen LLP

(57) ABSTRACT

Improved thrashing aware and self configuring cache architectures that reduce cache thrashing without increasing cache size or degrading cache hit access time, for a DSP. In one example embodiment, this is accomplished by selectively caching only the instructions having a higher probability of recurrence to considerably reduce cache thrashing.

3 Claims, 4 Drawing Sheets

CONTEXT INSTRUCTION CACHE ARCHITECTURE FOR A DIGITAL SIGNAL PROCESSOR

TECHNICAL FIELD OF THE INVENTION

The present invention relates to digital signal processors, and more particularly to real-time memory management for digital signal processors.

BACKGROUND OF THE INVENTION

A digital signal computer or digital signal processor (DSP) is a special purpose computer that is designed to optimize performance for digital signal processing applications, such as, for example, fast Fourier transforms, digital filters, image processing and speech recognition. DSP applications are characterized by real-time operation, high interrupt rates, and intensive numeric computations. In addition, DSP applications tend to be intensive in memory access operations and to require the input and output of large quantities of data. Thus, designs of DSPs may be quite different from those of general purpose processors.

One approach that has been used in the architecture of DSPs is the Harvard architecture, which utilizes separate, independent program and data memories so that two memories may be accessed simultaneously. This permits instructions and data to be accessed in a single clock cycle. Frequently, the program occupies less memory space than data. To achieve full memory utilization, a modified Harvard architecture utilizes the program memory for storing both instructions and data. Typically, the program and data memories are interconnected to the core processor by separate program and data buses.

When instructions and data are stored in the program memory, conflicts may arise in the fetching of instructions. Further, in the case of Harvard architecture, the instruction fetch and the data access can take place in the same clock cycle, which can lead to a conflict on the program memory bus. In this scenario, instructions which can generally be fetched in a single clock cycle for a case can stall a cycle due to conflict. This happens when the instructions fetch phase coincides with the memory access phase of a preceding load or store instruction on the program memory bus. Such instructions are cached in conflict cache so that next time when the same instructions are encountered, it can be fetched from the conflict cache to avoid the instruction fetch phase stalls. In addition to the conflict cache, traditional instruction cache is also required for fetching instructions from the external main memory. This results in requiring two different cache architectures.

Further, conventional instruction cache architectures exploit the locality of code to maximize cache-hits. Most of the cache architectures suffer from performance degradation due to cache thrashing, i.e., loading the cache with instruction and then removing it while it is still needed before it can be used by the computer system. Cache thrashing is, of course, undesirable, as it reduces the performance gains.

Conventional techniques reduce cache thrashing by increasing the cache size, increasing cache-associativity, having a victim cache, and so on. However, these techniques come with overheads like extra hardware, increased cache hit access time, and/or higher software overhead. Another conventional technique identifies frequently executed instructions after code-profiling and locking the cache through software to minimize cache thrashing. However, this technique requires additional overheads in terms of requiring profiling of code by user and extra instructions in the code to lock the cache. Further, this can make the code very cumbersome.

SUMMARY OF THE INVENTION

According to an aspect of the subject matter, there is provided a method for reducing cache thrashing in a DSP, comprising the steps of dynamically enabling caching of instructions upon encountering current frequently executed instructions in a program, and dynamically disabling the caching of the instructions upon encountering an exit point associated with the frequently executed instructions.

According to another aspect of the subject matter, there is provided a method for self configuring a cache memory in a digital signal processor, comprising determining during runtime execution of a program whether a current instruction is coming from an external main memory or internal memory, outputting an execution-space control signal based on the determination that code is executed from internal memory, determining whether a fetch phase of the current instruction coincides with the memory access phase of a preceding load or store instruction on program memory bus, if so, outputting a conflict instruction load enable signal so that the cache memory behaves like a conflict cache and store the current instruction in the cache memory upon receiving the execution-space control signal, and if the code is executed from external memory then enable a traditional instruction load enable signal so that the cache memory behaves likes a traditional cache and then store the current instruction in the cache memory upon receiving the execution-space control signal.

BRIEF DESCRIPTION OF THE DRAWINGS

Embodiments of the invention will now be described, by way of example only, with reference to the accompanying drawings in which.

DETAILED DESCRIPTION OF THE INVENTION

In the following detailed description of the various embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

The terms "cache", "cache memory", "instruction cache memory", "conflict cache memory" are used interchangeably throughout the document. Also, the terms "thrashing" and "cache thrashing" are used interchangeably throughout the document. In addition, the terms "code", "instructions", and "program" are used interchangeably throughout the document. In addition, the term "current frequently executed instructions" means first encountered one or more frequently executed instructions in the program during run-time.

Figure 1:
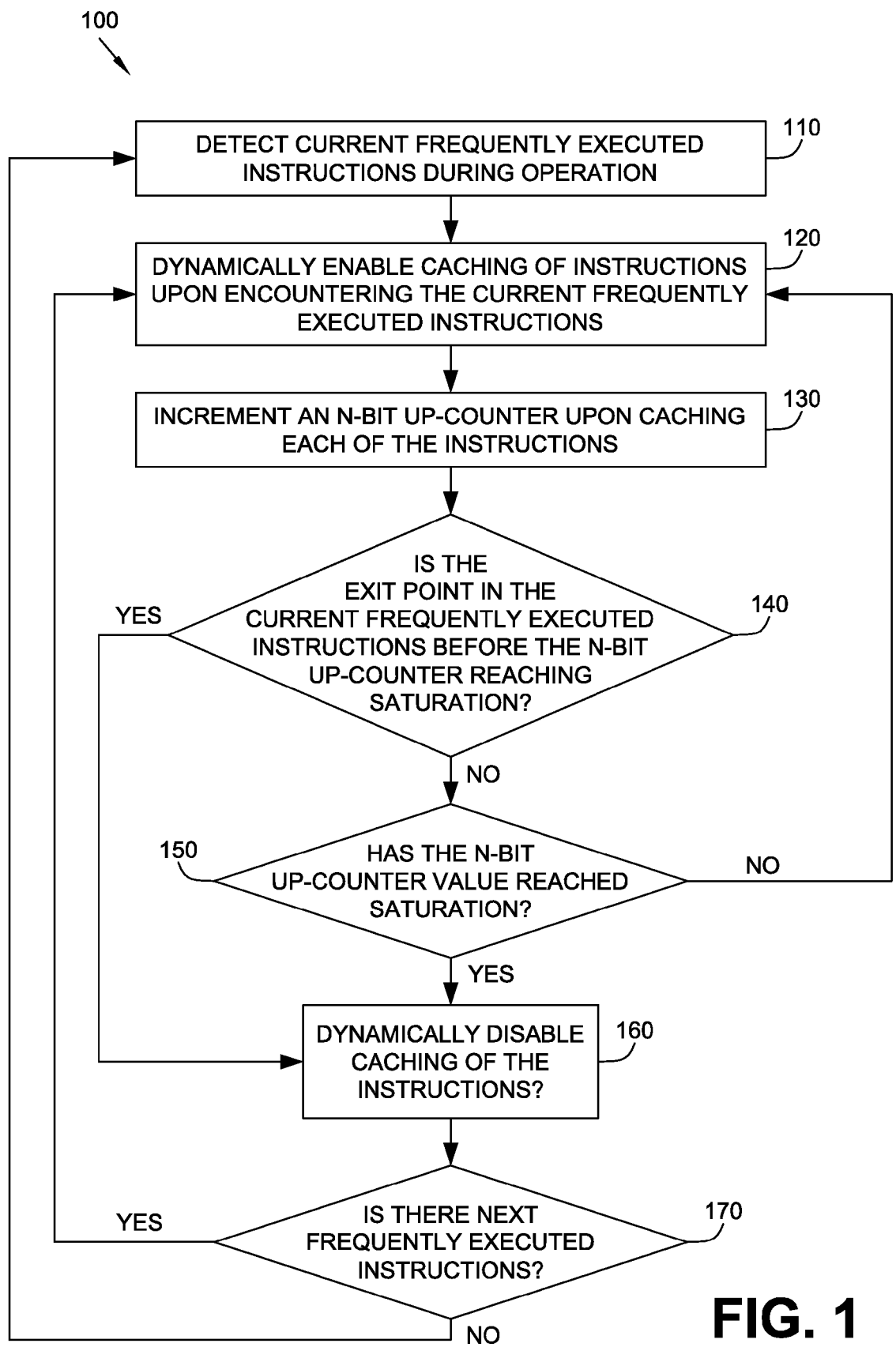
FIG. 1 is a flowchart illustrating a method for reducing cache thrashing in a DSP according to an embodiment of the present subject matter.

FIG. 1 illustrates an example method 100 for reducing cache thrashing in a digital signal processor (DSP). At step 110, this example method 100 begins by dynamically identifying frequently executed instructions in a program during run-time. Exemplary frequently executed instructions in the program include a hardware loop, a nested hardware loop, a call, a backward jump, and the like. In some embodiments, the frequently executed instructions include instructions having higher probability of reoccurrence during run-time of the program.

At step 120, current instructions are cached upon encountering the current frequently executed instructions in the program by dynamically enabling instruction cache memory. Generally, instruction cache memory is useful if same instruction is required again before the instruction is thrashed during run-time of the program. In some embodiments, the instruction cache is enabled only for those instructions which have higher probability of reoccurrence to reduce thrashing.

In some embodiments, caching of the instructions is dynamically disabled upon encountering an exit point in the current frequently executed instructions. The exit point refers to an exit found in frequently executed instructions, such as loop termination, call return, and the like. At step 130, an N-bit up-counter is incremented upon caching each instruction in the current frequently executed instructions in the instruction cache memory. In these embodiments, the N-bit up-counter has a number of states that is equal to number of entries available in the instruction cache memory.

At step 140, the method 100 determines whether the exit point in the current frequently executed instructions before the N-bit up-counter reaching saturation. Based on the determination at step 140, the method 100 goes to step 150. At step 150, the method 100 determines whether the N-bit up-counter has reached saturation. Based on the determination at step 150, the method 100 goes step 120 if the N-bit up-counter has not reached the saturation and repeats steps 120-150. Based on the determination at step 150 the method 100 goes to step 160 and dynamically disables caching of the current frequently executed instructions if the N-bit up-counter has reached the saturation. In these embodiments, the N-bit up-counter saturation can signify that instruction cache memory is saturated with instructions.

Based on the determination at step 140 the method 100 goes to step 160 and dynamically disables caching of the current frequently executed instructions if the exit point in the current frequently executed instructions is before the N-bit up-counter reaches saturation.

At step 170, the method 100 determines if there is a next frequently executed instructions. Based on the determination at step 170 the method 100 goes to step 120 and repeats steps 120-170 if there is a next frequently executed instructions in the program. In these embodiments, the instruction cache memory is dynamically re-enabled upon encountering next frequently executed instructions. Based on the determination at step 170 the method 100 goes to step 110 and repeats steps 110-170 if there is no other frequently executed set of instructions in the program.

In the case of a hardware loop or other such frequently occurring code including instructions that are greater than the length of the instruction cache memory, thrashing can occur causing a performance loss. As described above the proposed thrashing-aware scheme dynamically disables caching of the current frequently executed instructions once the instruction cache memory reaches saturation. The instruction cache memory is re-enabled when either the loop including the frequently executed instructions is terminated or a nested loop starts executing during run-time. This technique improves performance by reducing thrashing and increasing hit-ratio during run-time of the program. The above-described thrashing-aware technique is generally suitable for small instruction cache memories.

For example, in the case of a DSP having a small cache memory of 32 entries, the cache memory is very susceptible to thrashing if every instruction is cached during run-time. In the case of big loops, thrashing can lead to performance loss (i.e., for loop-sizes approximately greater than about 32) or for calls/Cjumps based subroutines which are greater than about 32 instruction. In order to avoid this problem, using a 5-bit up-counter to count 32 ACAM (address content addressable memory) loads in conjunction with instruction-based caching including a decoder logic circuit which decodes the frequently executed instructions, such as loops, calls, nested loops, negative jumps and the like as described above can increase cache hit-ratio. In this scenario, the 5 bit up-counter starts incrementing, upon encountering frequently executed instructions, with every instruction load to the instruction cache memory until the 5-bit up-counter reaches saturation at 32 loads. The instruction cache memory is disabled for that particular loop/call upon reaching saturation of the 5 bit up-counter.

The following equation illustrates the benefits of using the above-described technique to reduce thrashing and increase hit-ratio during run-time of a program:

Considering a case where an instruction cache memory has "X" entries and a frequently occurring set of instructions or code segment has a length of "Y" that occurs "N" times.

For conventional cache architecture:

If "$Y$"<"$X$", then the hit-ratio=$N-1/N$

If "$X$"<"$Y$"<"$2X$", then the hit-ratio=$(Y-(Y-X)*2)(N-1)/NY$

If "$Y$">"$2X$", then the Hit-ratio=0

For Thrashing-aware cache architecture:

If "$Y$"<"$X$", then the hit-ratio=$N-1/N$

If "$Y$">"$X$", then the hit-ratio=$X(N-1)/NY$

Now for "$X$"<"$Y$"<"$2X$",

The cache-hit advantage factor for thrashing aware cache architecture over the conventional cache architecture $$= X/(Y-(Y-X)*2)$$
$$= X/(2X-Y)$$

It can be seen that for "X"<"Y"<"2X", the cache-hit advantage factor (X)/2X−Y) can be always greater than 1. This confirms that the hit-ratio for thrashing-aware cache architecture can be always greater than the conventional cache architecture.

Similarly, for cases where "Y">"2X", conventional cache architecture returns 0 hits, whereas the thrashing aware cache architecture can continue to return "X" hits per iterations.

The above example clearly illustrates that the thrashing-aware cache architecture gives a better hit-ratio when compared with the conventional cache architecture when deploying a combination of caching the frequently executed instructions and exiting upon the cache counter saturation, without increasing cache-size or degrading cache-hit access time. In some embodiments, the current frequently executed instructions is held in the instructions cache memory until identifying and enabling caching of a next frequently executed instructions in the program. In these embodiments, caching of instructions is dynamically re-enabled upon encountering next frequently executed instructions.

Figure 2:
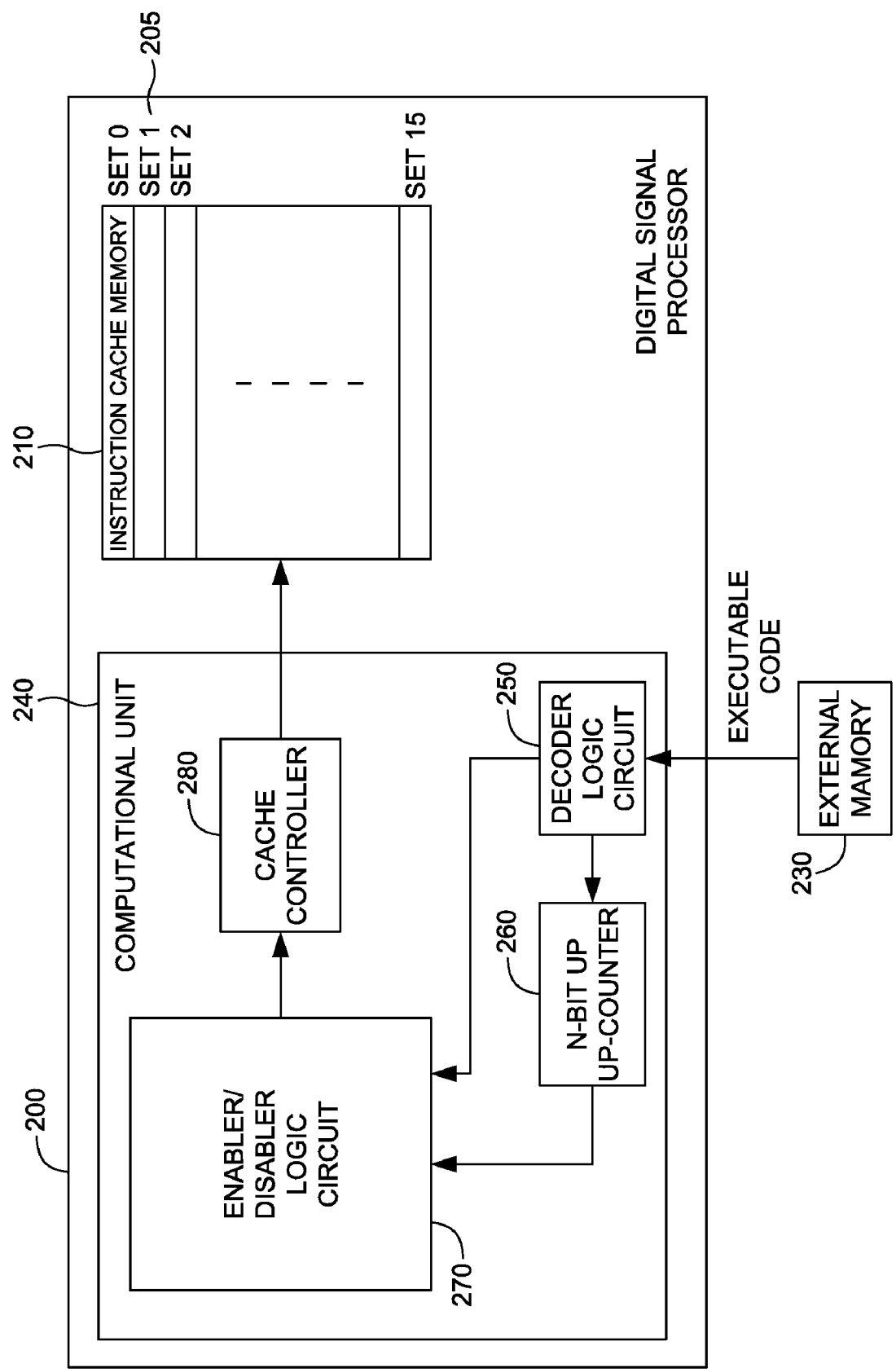
FIG. 2 illustrates a block diagram of a DSP cache memory according to an embodiment of the present subject matter, such as those shown in FIG. 1.

Referring now to FIG. 2, there is illustrated an example block diagram 200 of DSP thrashing-aware cache architecture. As shown in FIG. 2, the block diagram 200 includes an instruction cache memory 210, an external memory 230, and a computational unit 240. Further as shown in FIG. 2, the computational unit 240 includes a decoder logic circuit 250, an N-bit up-counter 260, an enabler/disabler logic circuit 270, and a cache controller 280. Furthermore, the instruction cache memory 210 is shown including SET 0 to SET 15, wherein each SET includes two entries making it a total of 32 entries in the instruction cache memory 210.

In operation, the computational unit 240 coupled to the instruction cache memory 210 dynamically enables loading of instructions upon encountering frequently executed instructions. Further, the computational unit 240 dynamically disables loading the instructions upon encountering an exit point associated with the frequently executed instructions in a program.

In some embodiments, the N-bit up-counter 260 has a number of states that is equal to a predetermined number of entries in the instruction cache memory 210. In these embodiments, the decoder logic circuit 250 locates the current frequently executed instructions in the program. Also, in these embodiments, the enabler/disabler logic circuit 270 enables storing of the instructions associated with the located frequently executed instructions via the cache controller 280. The N-bit up-counter 260 then increments upon storing each instruction in the instruction cache memory 210. The enabler/disabler logic circuit 270 then disables the storing of the instructions in the instruction cache memory 210 via the cache controller 280 upon the N-bit up-counter 260 reaching a saturation point or upon encountering the exit point in the instructions associated with the frequently executed instructions before reaching the saturation point.

In some embodiments, the instruction cache memory 210 has a predetermined number of entries 205. Also, in these embodiments, the N-bit up-counter 260 has a number of states that is equal to the predetermined number of entries in the internal cache memory 210. The N-bit up-counter 260 then increments a counter value for each instruction that is stored in the instruction cache memory 210. The enabler/disabler logic circuit 270 then disables the storing of the instructions in the frequently executed instructions via the cache controller 280 upon the N-bit up-counter 260 reaching a counter value equal to the number of states in the N-bit up-counter 260 or upon encountering the exit point in the instructions before the counter value in the N-bit up-counter 260 becomes equal to the number of states in the N-bit up-counter 260.

The operation of the thrashing-aware cache architecture shown in FIG. 2 is described above in more detail with reference to the flowchart 100 shown in FIG. 1.

Figure 3:
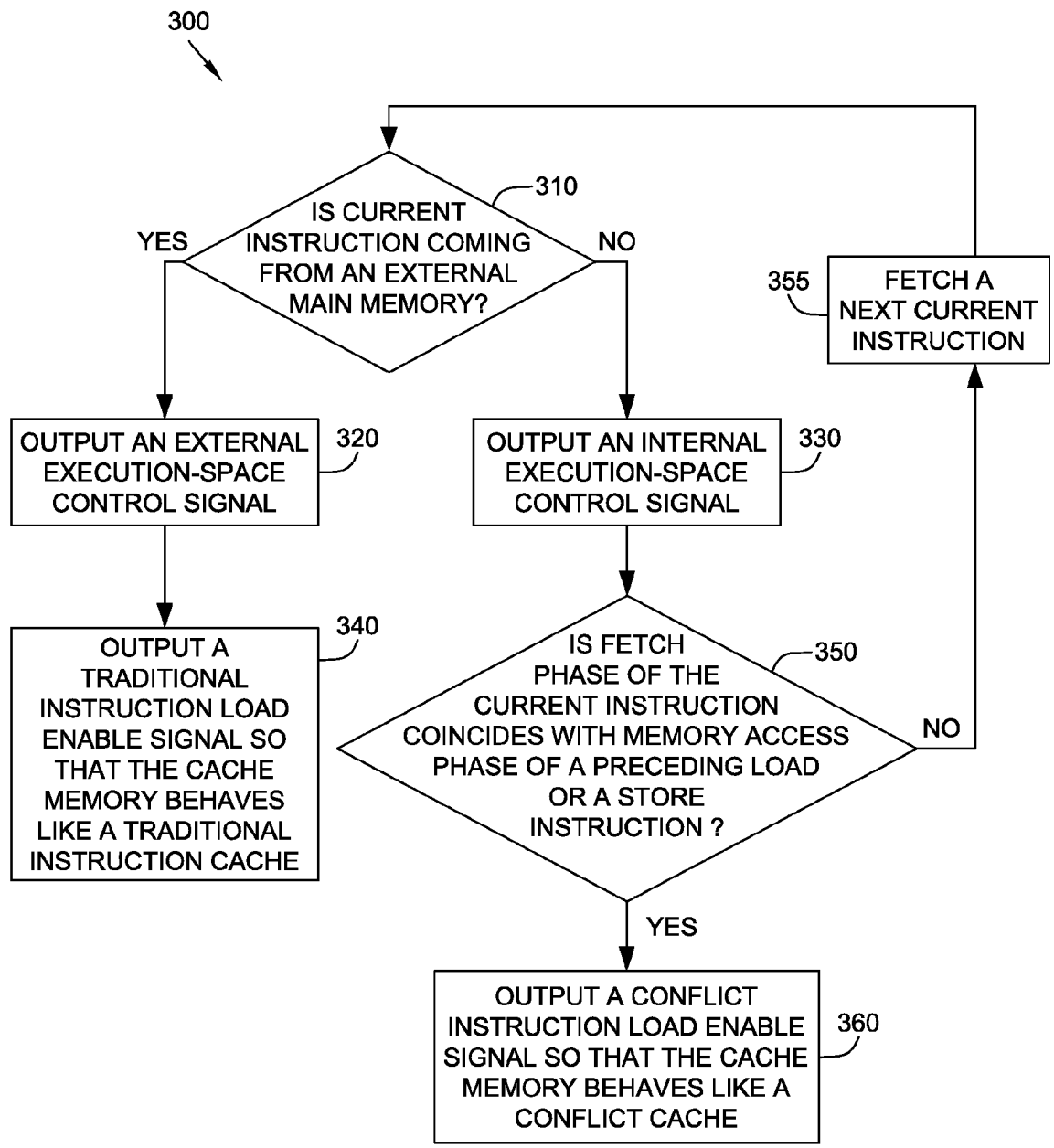
FIG. 3 is a flowchart illustrating a method for self configuring an instruction cache memory in a DSP according to an embodiment of the present subject matter.

FIG. 3 illustrates an example method 300 for a self-configuring cache in a digital signal processor (DSP). At step 310, this example method 300 begins by dynamically determining whether a current instruction in an executable program is coming from an external memory or an internal memory.

Based on the determination at step 310, the method 300 goes to step 320 and outputs an external execution-space control signal if the current instruction is coming from the external memory. At step 340, a traditional instruction load enable signal is outputted so that the cache memory behaves like a traditional cache.

Based on the determination at step 310, the method 300 goes to step 330 and outputs an internal execution-space control signal if the current instruction is coming from the internal memory. At step 350, the method determines whether the fetch phase of the current instruction coincides with the memory access of a preceding load or a store instruction. Based on the determination at step 350 the method 300 goes to step 360 if the fetch phase of the current instruction coincides with the memory access of the preceding load of the store instruction and outputs a conflict instruction load enable signal so that the cache memory behaves like a conflict cache. This generally indicates a conflict condition. Based on the determination at step 350 the method 300 goes to step 310 via step 355 to fetch a next current instruction and repeats steps 310-360 if the fetch phase of the current instruction does not coincide with the memory access of the preceding load or the store instruction.

Figure 4:
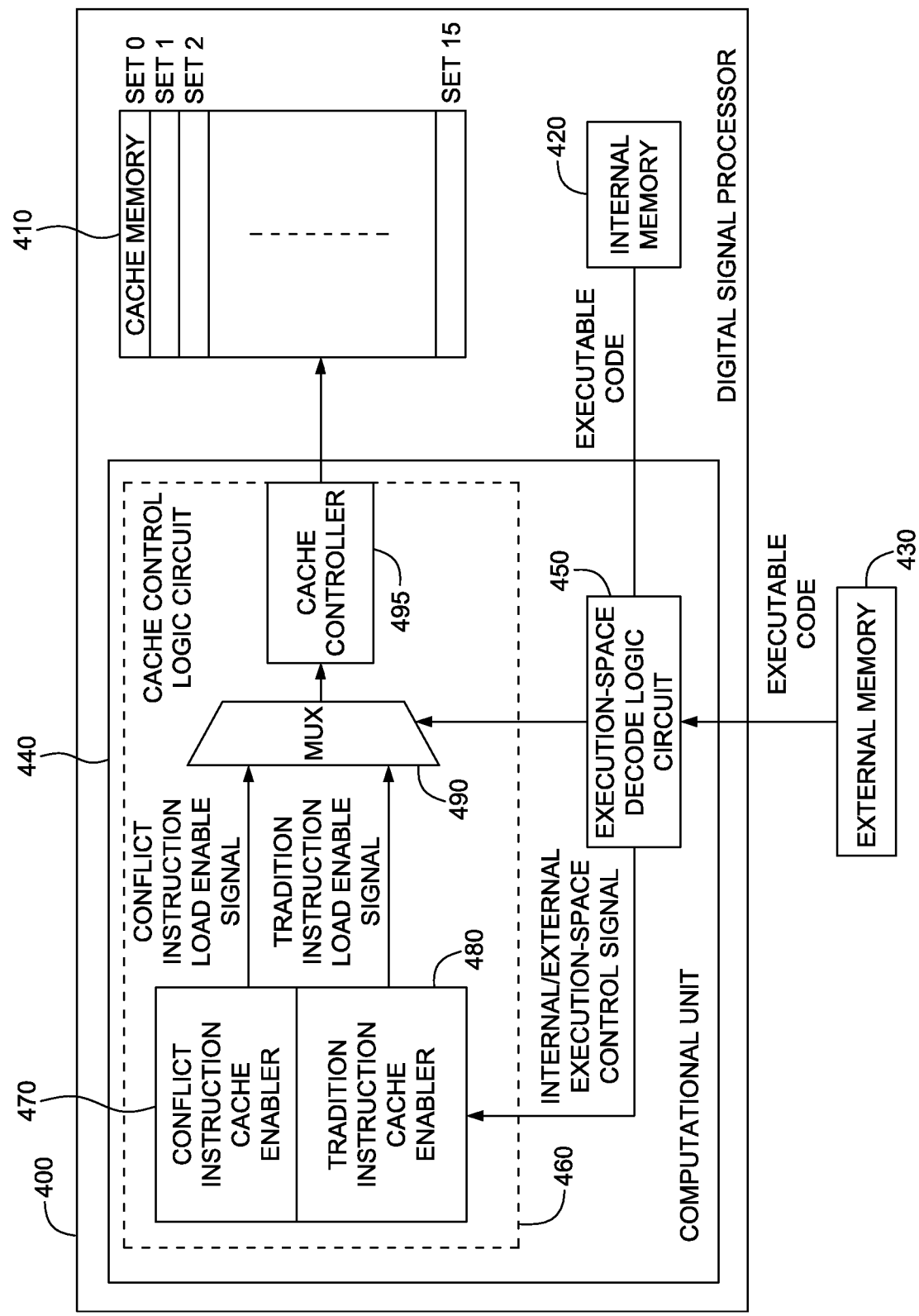
FIG. 4 illustrates a block diagram of a DSP cache memory according to an embodiment of the present subject matter, such as FIG. 3.

Referring now to FIG. 4, there is illustrated an example block diagram 400 of DSP self-configuring cache architecture. As shown in FIG. 4, the block diagram 400 includes a cache memory 410, an internal memory 420, an external memory 430, and a computational unit 440. As shown in FIG. 4, the computational unit 440 further comprises an execution-space decode logic circuit 450 and a cache control logic circuit 460. Further as shown in FIG. 4, the cache control logic circuit 460 includes a conflict instruction cache enabler 470, a traditional instruction cache enabler 480, a MUX 490, and a cache controller 495.

In operation, the execution-space decode logic circuit 450 dynamically determines whether a current instruction in an executable program is coming from the external memory 430 or the internal memory 420. The cache control logic circuit 460 then configures the cache memory 410 to behave like a traditional cache or a conflict cache based on an outcome of the determination by the execution-space decode logic circuit 450. The cache control logic circuit 460 then transfers the current instruction to and between the cache memory 410, the internal memory 420 and the external memory 430 based on the configured cache memory.

In some embodiments, the execution-space decode logic circuit 450 determines during run-time execution of the executable instructions whether a current instruction in the executable instructions in the executable program is coming from the external memory 430 or the internal memory 420. The execution-space decode logic circuit 450 then outputs an external execution-space control signal if the current instruction is coming from the external memory 430 and outputs an internal execution-space control signal if the current instruction is coming from the internal memory 420.

In some embodiments, the conflict instruction cache enabler 470 determines whether the current instruction in the executable program has a memory conflict condition and then outputs a conflict instruction load enable signal upon finding the memory conflict condition. The traditional instruction cache enabler 480 then enables a traditional instruction load enable signal for the current instruction in the executable program upon receiving the current instruction from the external memory 430. The MUX 490 then outputs an instruction load enable signal via the cache controller 495 and configures the cache memory 410 to behave like a traditional cache or a conflict cache based on the instruction load enable signal. The instruction load enable signal then transfers the current instruction to and between the cache memory 410, the internal memory 420, and the external memory 430 based on the configuration of the cache memory 410.

In some embodiments, the MUX 490 outputs the instruction load enable signal and enables the cache memory 410 to behave like a conflict cache via the cache controller 495 and transfers the current instruction to and between the internal memory 420, the cache memory 410 and the computational unit 440 upon finding a memory conflict condition and receiving the internal execution-space control signal from the conflict instruction cache enabler 470. In these embodiments, the MUX 490 outputs the instruction load enable signal and enables the cache memory 410 to behave like a traditional cache via the cache controller 495 and transfers the current instruction, coming from the external memory 430, to and between the cache memory 410 and the computation unit 440 upon receiving the current instruction from the external memory 430 and the traditional instruction load enable signal from the traditional instruction cache enabler 480.

Although the flowcharts 100 and 300 shown in FIGS. 1 and 3 include steps 110-170 and 310-360 that are arranged serially in the exemplary embodiments, other embodiments of the subject matter may execute two or more steps in parallel, using multiple processors or a single processor organized as two or more virtual machines or sub-processors. Moreover, still other embodiments may implement the steps as two or more specific interconnected hardware modules with related control and data signals communicated between and through the modules, or as portions of an application-specific integrated circuit. Thus, the exemplary process flow diagrams are applicable to software, firmware, and/or hardware implementations.

The above thrashing-aware architecture increases the digital signal processor performance by reducing cache thrashing and increasing hit-ratio. Further, the above process lowers power dissipation by reducing loading of unwanted instructions into cache memory. Further, the above thrashing-aware process is suitable for caches of small sizes used in digital signal processors.

The above-described self-configuring cache architecture is facilitates in significantly improving the cache functionality by using the same cache hardware as a traditional cache and conflict cache thereby eliminating the need for having two physically different cache in a DSP. The above described context switching self-configuring cache seamlessly switches between conflict cache to traditional cache and vice-versa without any user intervention. The above process uses same cache hardware as conflict cache to avoid resource-conflict during code execution from internal memory and as traditional instruction cache to improve performance during code execution from external memory where there is no resource-conflict.

The above techniques can be implemented using an apparatus controlled by a processor where the processor is provided with instructions in the form of a computer program constituting an aspect of the above technique. Such a computer program may be stored in storage medium as computer readable instructions so that the storage medium constitutes a further aspect of the present subject matter.

Although the flowchart shown in FIG. 1 depicts a simple case of caching the frequently executed instructions which are not nested to improve hit ratio, one can envision implementing the above-described process for nested loops and other such frequently executed instructions as well.

The above description is intended to be illustrative, and not restrictive. Many other embodiments will be apparent to those skilled in the art. The scope of the subject matter should therefore be determined by the appended claims, along with the full scope of equivalents to which such claims are entitled.

As shown herein, the present subject matter can be implemented in a number of different embodiments, including various methods, a circuit, an I/O device, a system, and an article comprising a machine-accessible medium having associated instructions.

Other embodiments will be readily apparent to those of ordinary skill in the art. The elements, algorithms, and sequence of operations can all be varied to suit particular requirements. The operations described-above with respect to the methods illustrated in FIGS. 1, 2, and 4 can be performed in a different order from those shown and described herein.

FIGS. 1-4 are merely representational and are not drawn to scale. Certain proportions thereof may be exaggerated, while others may be minimized. FIGS. 1-4 illustrate various embodiments of the subject matter that can be understood and appropriately carried out by those of ordinary skill in the art.

In the foregoing detailed description of the embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive invention lies in less than all features of a single disclosed embodiment. Thus the following claims are hereby incorporated into the detailed description of the embodiments of the invention, with each claim standing on its own as a separate preferred embodiment.

The invention claimed is:

1. A self-configuring cache architecture for a digital signal processor, comprising a computational unit, the computational unit comprising:
   an execution-space decode logic circuit that
   (i) dynamically determines, during run-time execution of an executable program, whether a current instruction in the executable program is coming from an external memory or an internal memory and
   (ii) outputs an external execution-space control signal if the current instruction is coming from the external memory and outputs an internal execution-space control signal if the current instruction is coming from the internal memory; and
   a cache control logic circuit that configures a cache memory to store, in a traditional cache space, a conflict-free instruction from the external memory or to store, in a conflict cache space, a conflicted instruction from the internal memory based on an outcome of the determination,
   wherein the cache control logic circuit transfers the current instruction to and between the cache memory, the internal memory, and the external memory based on the configuration of the cache memory, thereby avoiding a pipeline stall during a next use of the current instruction, the cache control logic circuit comprising:
   a cache controller;
   a conflict instruction cache enabler that determines whether the current instruction in the executable program has a memory conflict condition and then outputs a conflict instruction load enable signal upon finding the memory conflict condition;
   a traditional instruction cache enabler that enables a traditional instruction load enable signal for the current instruction in the executable program upon receiving the current instruction from the external memory, wherein the conflict instruction cache enabler and the traditional instruction cache enabler output an instruction load enable signal via the cache controller to configure the cache memory to behave like a traditional cache or a conflict cache based on the instruction load enable signal, wherein the instruction load enable signal transfers the current instruction to and between the cache memory, the internal memory, and the external memory based on the configuration of the cache memory; and a MUX, coupled to the execution-space decode logic circuit, outputs the instruction load enable signal and enables the cache memory to behave like a conflict cache via the cache controller and transfers the current instruction to and between the internal memory, cache memory and the computational unit upon finding the memory conflict condition and receiving the internal execution-space control signal.

2. The self-configuring cache architecture of claim 1, wherein the MUX outputs the instruction load enable signal and enables the cache memory to behave like a traditional cache via the cache controller and transfers the current instruction, coming from the external memory, to and between the cache memory and the computation unit upon receiving the current instruction from the external memory and the traditional instruction load enable signal from the traditional instruction cache enabler.

3. A method for self configuring a cache memory in a digital signal processor, comprising:

dynamically determining, during run-time execution of an executable program, whether a current instruction in the executable program is coming from an external memory or an internal memory;

outputting an external execution-space control signal if the current instruction is coming from the external memory and outputting an internal execution-space control signal if the current instruction is coming from the internal memory;

configuring a cache memory to store, in a traditional cache space, a conflict-free instruction from the external memory or to store, in a conflict cache space, a conflicted instruction from the internal memory based on an outcome of the determination;

transferring the current instruction to and between the cache memory, the internal memory, and the external memory based on the configuration of the cache memory, thereby avoiding a pipeline stall during a next use of the current instruction; and determining whether the current instruction in the executable program has a memory conflict condition by determining whether a fetch phase of the current instruction coincides with the memory access phase of a preceding load or store instruction on program memory bus;

if so, outputting a conflict instruction load enable signal so that the cache memory behaves like a conflict cache and stores the current instruction in the cache memory upon receiving the internal execution-space control signal; and if not, outputting a traditional instruction load enable signal so that the cache memory behaves like a traditional cache and then stores the current instruction in the cache memory upon receiving the external execution-space control signal wherein the cache memory is configured to behave like a traditional cache or a conflict cache based on an instruction load enable signal, which transfers the current instruction to and between the cache memory, the internal memory, and the external memory based on the configuration of the cache memory, and wherein a MUX is used to (i) output the instruction load enable signal, (ii) enable the cache memory to behave like a conflict cache, and (iii) transfer the current instruction to and between the internal memory, cache memory and a computational unit upon finding the memory conflict condition and receiving the internal execution-space control signal.

* * * * *